(12) United States Patent
Takihana et al.

(10) Patent No.: US 9,987,817 B2
(45) Date of Patent: Jun. 5, 2018

(54) METAL-RESIN COMPOSITE BODY

(71) Applicant: SUMITOMO BAKELITE CO., LTD., Tokyo (JP)

(72) Inventors: Yoshihiro Takihana, Tokyo (JP); Koji Koizumi, Tokyo (JP); Yusuke Watanabe, Tokyo (JP)

(73) Assignee: SUMITOMO BAKELITE COMPANY LIMITED, Tokyo (JP)

( * ) Notice: Subject to any disclaimer, the term of this patent is extended or adjusted under 35 U.S.C. 154(b) by 0 days. days.

(21) Appl. No.: 15/103,715

(22) PCT Filed: Nov. 28, 2014

(86) PCT No.: PCT/JP2014/081606
§ 371 (c)(1),
(2) Date: Jun. 10, 2016

(87) PCT Pub. No.: WO2015/087720
PCT Pub. Date: Jun. 18, 2015

(65) Prior Publication Data
US 2016/0303820 A1    Oct. 20, 2016

(30) Foreign Application Priority Data

Dec. 13, 2013   (JP) .................................. 2013-258455

(51) Int. Cl.
*B32B 3/30* (2006.01)
*B32B 15/18* (2006.01)
(Continued)

(52) U.S. Cl.
CPC .......... *B32B 3/30* (2013.01); *B29C 45/14311* (2013.01); *B29C 45/14778* (2013.01);
(Continued)

(58) Field of Classification Search
CPC .. B32B 3/30; B32B 7/12; B32B 27/06; B32B 27/20; B32B 15/04; B32B 15/08
See application file for complete search history.

(56) References Cited

U.S. PATENT DOCUMENTS 9,209,044 B2      12/2015  Kajiwara et al.
2010/0189957 A1*  7/2010   Naritomi ................... B32B 7/12
                                                              428/141
(Continued)

FOREIGN PATENT DOCUMENTS

JP         9-95596 A      4/1997
JP      2000-44771 A      2/2000
(Continued)

OTHER PUBLICATIONS

International Search Report dated Feb. 24, 2015, issued in counterpart Application No. PCT/JP2014/081606 (2 pages).

*Primary Examiner* — Nathan L Van Sell
(74) *Attorney, Agent, or Firm* — Westerman, Hattori, Daniels & Adrian, LLP

(57) ABSTRACT

A metal-resin composite body (100) of the present invention is obtained by bonding a resin member (101) and a metal member (102) together. The resin member (101) is obtained by curing a thermosetting resin composition (P) containing a thermosetting resin (A) and a filler (B). The metal member (102) has a roughened layer (104) including fine irregularities on at least a bonding surface (103) bonded to the resin member (101). A portion of the filler (B) is present in depression portions constituting the irregularities of the roughened layer (104).

13 Claims, 6 Drawing Sheets

(51) Int. Cl.

| | | |
|---|---|---|
| B32B 25/18 | (2006.01) | |
| B32B 25/20 | (2006.01) | |
| B32B 25/12 | (2006.01) | |
| B32B 15/06 | (2006.01) | |
| B32B 15/098 | (2006.01) | |
| B32B 7/04 | (2006.01) | |
| B32B 25/16 | (2006.01) | |
| B32B 25/14 | (2006.01) | |
| B32B 27/42 | (2006.01) | |
| B32B 15/20 | (2006.01) | |
| B32B 27/06 | (2006.01) | |
| B32B 27/20 | (2006.01) | |
| B32B 7/12 | (2006.01) | |
| B32B 15/04 | (2006.01) | |
| B32B 15/08 | (2006.01) | |
| B29C 45/14 | (2006.01) | |
| B29C 65/00 | (2006.01) | |
| C23F 1/20 | (2006.01) | |
| C23F 1/36 | (2006.01) | |

(52) U.S. Cl.
CPC ........ *B29C 66/026* (2013.01); *B29C 66/7422* (2013.01); *B32B 7/04* (2013.01); *B32B 7/12* (2013.01); *B32B 15/04* (2013.01); *B32B 15/06* (2013.01); *B32B 15/08* (2013.01); *B32B 15/098* (2013.01); *B32B 15/18* (2013.01); *B32B 15/20* (2013.01); *B32B 25/12* (2013.01); *B32B 25/14* (2013.01); *B32B 25/16* (2013.01); *B32B 25/18* (2013.01); *B32B 25/20* (2013.01); *B32B 27/06* (2013.01); *B32B 27/20* (2013.01); *B32B 27/42* (2013.01); *C23F 1/20* (2013.01); *C23F 1/36* (2013.01); *B29C 2045/14868* (2013.01); *B32B 2250/02* (2013.01); *B32B 2264/10* (2013.01); *B32B 2264/102* (2013.01); *B32B 2264/104* (2013.01); *B32B 2270/00* (2013.01); *B32B 2274/00* (2013.01)

(56) References Cited

U.S. PATENT DOCUMENTS

| | | | |
|---|---|---|---|
| 2011/0008644 A1* | 1/2011 | Naritomi | B29C 45/14311 428/612 |
| 2012/0141818 A1 | 6/2012 | Kajiwara et al. | |
| 2016/0010213 A1 | 1/2016 | Kajiwara et al. | |

FOREIGN PATENT DOCUMENTS

| | | |
|---|---|---|
| JP | 2002-212388 A | 7/2002 |
| JP | 2010-274600 A | 12/2010 |
| JP | 2011-121306 A | 6/2011 |
| JP | 2011-121309 A | 6/2011 |
| JP | 2011-174099 A | 9/2011 |
| JP | 2012-116126 A | 6/2012 |
| JP | 2013-52671 A | 3/2013 |
| WO | 2011/071102 A1 | 6/2011 |

\* cited by examiner

METAL-RESIN COMPOSITE BODY

TECHNICAL FIELD

The present invention relates to a metal-resin composite body.

BACKGROUND ART

A technique for bonding a resin member and a metal member together is required in various fields such as aircrafts, automobiles, home appliances, and industrial machines.

As a method for bonding a resin member and a metal member together, a method has been suggested in which fine irregularities are formed on the surface of the metal member, a thermosetting resin composition is caused to permeate the fine irregularities, and then the thermosetting resin composition is cured such that a resin member composed of the thermosetting resin composition and the metal member are bonded together (for example, Patent Documents 1 and 2).

RELATED DOCUMENT

Patent Document

[Patent Document 1] Japanese Unexamined Patent Publication No. 2010-274600

[Patent Document 2] Japanese Unexamined Patent Publication No. 2012-116126

SUMMARY OF THE INVENTION

However, according to the examination conducted by the inventors of the present invention, it has become evident that with the method of bonding the resin member and the metal member together by causing a thermosetting resin composition to permeate into the fine irregularities on the surface of the metal member as described in Patent Documents 1 and 2, a sufficient bond strength is not obtained in some cases. That is, the bond strength of the metal-resin composite body obtained by the methods described in Patent Documents 1 and 2 is not completely satisfactory.

The present invention has been made in consideration of the above circumstances, and an object thereof is to provide a metal-resin composite body which has excellent bond strength between a resin member and a metal member.

In order to improve the bond strength between a resin member and a metal member, the inventors of the present invention examined the adjustment of the surface roughness Ra or Rz of the metal member.

However, it has become evident that simply by adjusting the surface roughness Ra or Rz of the metal member, the bond strength between the resin member and the metal member cannot be sufficiently improved.

Therefore, in order to improve the bond strength between the resin member and the metal member, the inventors conducted intensive examination. As a result, they found that, by adopting a constitution, in which a roughened layer including fine irregularities is formed on the surface of the metal member, and a filler is provided in depression portions constituting the irregularities of the roughened layer, a metal-resin composite body which has excellent bond strength between the resin member and the metal member can be obtained. In this way, the inventors accomplished the present invention.

That is, according to the present invention, there is provided a metal-resin composite body obtained by bonding a resin member and a metal member together, in which the resin member is obtained by curing a thermosetting resin composition containing a thermosetting resin and a filler, the metal member has a roughened layer including fine irregularities on at least a bonding surface bonded to the resin member, and a portion of the filler is present in depression portions constituting the irregularities of the roughened layer.

That is, according to the present invention, it is possible to provide a metal-resin composite body which has excellent bond strength between a resin member and a metal member.

BRIEF DESCRIPTION OF THE DRAWINGS

The aforementioned object and other objects, characteristics, and advantages are further clarified by the preferred embodiments described below and the accompanying drawings below.

DESCRIPTION OF EMBODIMENTS

Figure 1:
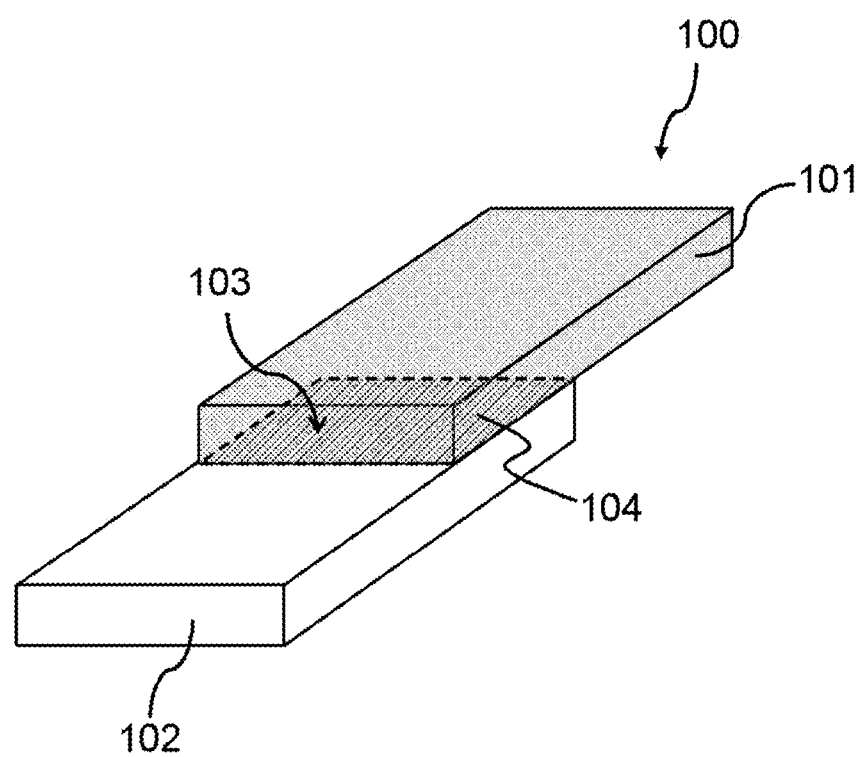
FIG. 1 is a perspective view showing an example of the structure of a metal-resin composite body according to an embodiment of the present invention.

Hereinafter, embodiments of the present invention will be described using drawings. In all of the drawings, the same constituents are marked with the same reference numerals so as not to repeat the description thereof. Furthermore, unless otherwise specified, a range of numerical values described using "to" is a range in which the numerical values listed before and after "to" are the upper limit and the lower limit respectively.

Figure 2:
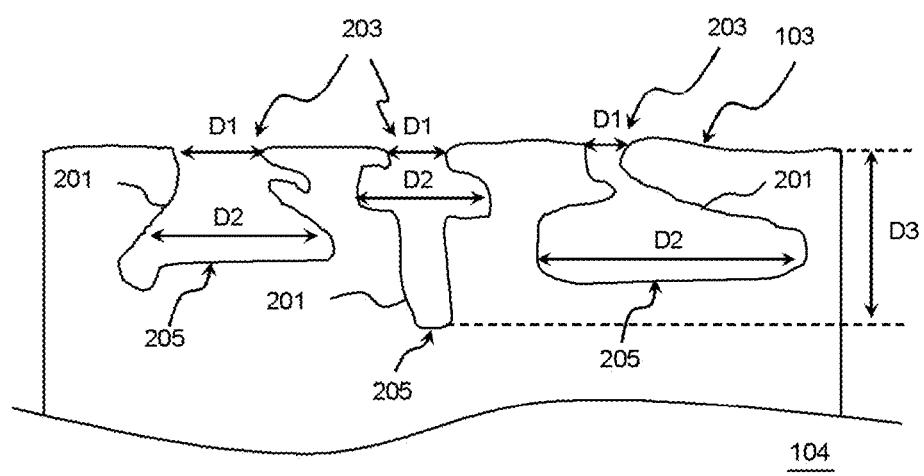
FIG. 2 is a schematic view for illustrating an example of sectional shapes of depression portions constituting a roughened layer on the surface of a metal member according to an embodiment of the present invention.

FIG. 1 is a perspective view showing an example of the structure of a metal-resin composite body 100 according to an embodiment of the present invention. FIG. 2 is a schematic view for illustrating an example of sectional shapes of depression portions 201 constituting a roughened layer 104 on the surface of a metal member 102 according to an embodiment of the present invention.

The metal-resin composite body 100 is obtained by bonding a resin member 101 and the metal member 102 together. The resin member 101 is obtained by curing a thermosetting resin composition (P) containing a thermosetting resin (A) and a filler (B). The metal member 102 has the roughened layer 104 including fine irregularities on at least a bonding surface 103 bonded to the resin member 101. In the depression portions 201 constituting the irregularities of the roughened layer 104, a portion of the filler (B) is present.

<Metal Member>

Hereinafter, the metal member 102 will be described.

From the viewpoint of improving the bond strength between the resin member 101 and the metal member 102, the metal member 102 has the roughened layer 104 including fine irregularities on the bonding surface 103 of the metal member 102 that is bonded to the resin member 101. Herein, the roughened layer 104 refers to a region which is on the surface of the metal member 102 and has a plurality of depression portions 201.

The thickness of the roughened layer 104 is preferably equal to or greater than 3 µm to equal to or less than 40 µm, more preferably equal to or greater than 4 µm and equal to or less than 32 µm, and particularly preferably equal to or greater than 4 µm and equal to or less than 30 µm. When the thickness of the roughened layer 104 is within the above range, the bond strength between the metal member 102 and the resin member 101 can be further improved. In the present embodiment, the thickness of the roughened layer 104 refers to a depth D3 of a depression portion having the greatest depth among a plurality of depression portions 201, and can be calculated from an image of an electron microscope (SEM).

It is preferable that each depression portion 201 has such a sectional shape that, between an opening portion 203 and a bottom portion 205 of the depression portion 201, there is at least a portion whose section width D2 is greater than a section width D1 of the opening portion 203.

As shown in FIG. 2, the sectional shape of the depression portion 201 is not particularly limited as long as D2 is greater than D1, and various shapes can be adopted. The sectional shape of the depression portion 201 can be observed with, for example, an electron microscope (SEM).

It is unclear why the metal-resin composite body 100 in which the bond strength is further improved is obtained when the depression portion 201 has the aforementioned sectional shape. However, presumably, that is because the bonding surface 103 has a surface structure by which the anchor effect between the resin member 101 and the metal member 102 can be more strongly exhibited.

When the depression portion 201 has the aforementioned sectional shape, the resin member 101 is entangled in the depression portion 201 throughout the opening portion 203 and the bottom portion 205, and thus the anchor effect is effectively exerted. It is considered that, for this reason, the bond strength between the resin member 101 and the metal member 102 is improved.

The average depth of the depression portion 201 is preferably equal to or greater than 0.5 µm and equal to or less than 40 µm, and more preferably equal to or greater than 1 µm and equal to or less than 30 µm. When the average depth of the depression portion 201 is equal to or less than the upper limit described above, the thermosetting resin composition (P) can sufficiently permeate deep into the depression portion 201, and hence the mechanical strength of the region in which the resin member 101 and the metal member 102 permeate to each other can be further improved. When the average depth of the depression portion 201 is equal to or greater than the lower limit described above, the ratio of the filler (B) present in the depression portion 201 can be increased, and hence the mechanical strength of the region in which the resin member 101 and the metal member 102 permeate to each other can be further improved. Consequently, when the average depth of the depression portion 201 is within the above range, the bond strength between the resin member 101 and the metal member 102 can be further improved.

The average depth of the depression portion 201 can be measured using an image of a scanning electron microscope (SEM) as below, for example. First, the section of the roughened layer 104 is imaged by a scanning electron microscope. From the image observed, 50 depression portions 201 are randomly selected, and the depth of each of them is measured. Then, all of the depths of the depression portions 201 are added up and divided by 50, thereby obtaining the average depth.

The average section width of the opening portion 203 of the depression portion 201 is preferably equal to or greater than 2 µm and equal to or less than 60 µm, more preferably equal to or greater than 3 µm and equal to or less than 50 µm, and even more preferably equal to or greater than 3 µm and equal to or less than 30 µm. When the average section width of the opening portion 203 is equal to or less than the upper limit described above, the anchor effect between the resin member 101 and the metal member 102 can be more strongly exhibited. When the average section width of the opening portion 203 is equal to or greater than the lower limit described above, the ratio of the filler (B) present in the depression portion 201 can be increased, and hence the strength of the resin member 101 in the bonding portion between the resin member 101 and the metal member 102 can be improved. Therefore, when the average section width of the opening portion 203 is within the above range, the bond strength between the resin member 101 and the metal member 102 can be further improved.

The average section width of the opening portion 203 can be measured using an SEM image as below, for example. First, the section of the roughened layer 104 is imaged by a scanning electron microscope. From the image observed, 50 depression portions 201 are randomly selected, and the section width D1 of each of them is measured. Then, all of the section widths D1 of the opening portions 203 are added up and divided by 50, thereby obtaining the average section width.

The surface roughness Ra of the bonding surface 103 of the metal member 102 is preferably equal to or greater than 0.5 µm and equal to or less than 40.0 µm, more preferably equal to or greater than 1.0 µm and equal to or less than 20.0 µm, and particularly preferably equal to or greater than 1.0 µm and equal to or less than 10.0 µm. When the surface roughness Ra is within the above range, the bond strength between the resin member 101 and the metal member 102 can be further improved.

The maximum height Rz of the bonding surface 103 of the metal member 102 is preferably equal to or greater than 1.0 µm and equal to or less than 40.0 µm, and more preferably equal to or greater than 3.0 µm and equal to or less than 30.0 µm. When the maximum height Rz is within the above range, the bond strength between the resin member 101 and the metal member 102 can be further improved. Herein, Ra and Rz can be measured based on JIS-B0601.

In the metal member 102, the ratio of an actual surface area, which is measured by a nitrogen adsorption BET method, to an apparent surface area of at least the bonding surface 103 bonded to the resin member 101 (hereinafter, simply referred to as a specific surface area as well) is preferably equal to or greater than 100, and more preferably equal to or greater than 150. When the specific surface area is equal to or greater than the lower limit described above, the bond strength between the resin member 101 and the metal member 102 can be further improved. The specific surface area is preferably equal to or less than 400, more preferably equal to or less than 380, and particularly preferably equal to or less than 300. When the specific surface area is equal to or less than the upper limit described above, the bond strength between the resin member 101 and the metal member 102 can be further improved.

In the present embodiment, the apparent surface area means a surface area determined on the assumption that the surface of the metal member 102 has a smooth surface shape free of irregularities. For example, in a case where the surface shape is rectangular, the apparent surface area is represented by width×length. In contrast, in the present embodiment, the actual surface area determined by a nitrogen adsorption BET method means a BET surface area determined by an adsorption amount of nitrogen gas. For example, for a vacuum-dried sample for measurement, an adsorption and desorption amount of nitrogen at the temperature of liquid nitrogen is measured using an automatic specific surface area/pore distribution analyzer (BELSORP-mini II manufactured by BEL Japan, Inc.), and based on the adsorption and desorption amount of nitrogen, the actual surface area can be calculated.

It is unclear why the metal-resin composite body 100 in which the bond strength is further improved is obtained when the specific surface area is within the above range. However, presumably, that is because the bonding surface 103 bonded to the resin member 101 has a surface structure by which the anchor effect between the resin member 101 and the metal member 102 can be more strongly exhibited.

When the specific surface area is equal to or greater than the lower limit described above, the contact area between the resin member 101 and the metal member 102 is enlarged, and thus the number of regions in which the resin member 101 and the metal member 102 permeate to each other is increased. It is considered that, as a result, the number of regions in which the anchor effect is exerted is increased, and hence the bond strength between the resin member 101 and the metal member 102 is further improved.

In contrast, when the specific surface area is too large, in the region in which the resin member 101 and the metal member 102 permeate to each other, the ratio of the metal member 102 is reduced, and hence the mechanical strength of the region is decreased. Accordingly, it is considered that when the specific surface area is equal to or less than the upper limit described above, the mechanical strength of the region in which the resin member 101 and the metal member 102 permeate to each other is further improved, and hence the bond strength between the resin member 101 and the metal member 102 can be further improved.

For the above reasons, it is assumed that, when the specific surface area is within the above range, the bonding surface 103 bonded to the resin member 101 has an excellently balanced surface structure by which the anchor effect between the resin member 101 and the metal member 102 is more strongly exhibited.

The metal member 102 is not particularly limited. A degree of glossiness of at least the bonding surface 103 to be bonded to the resin member 101 is preferably equal to or greater than 0.1, more preferably equal to or greater than 0.5, and even more preferably equal to or greater than 1. When the degree of glossiness is equal to or greater than the lower limit described above, the bond strength between the resin member 101 and the metal member 102 can be further improved. The degree of glossiness is preferably equal to or less than 30, and more preferably equal to or less than 20. When the degree of glossiness is equal to or less than the upper limit described above, the bond strength between the resin member 101 and the metal member 102 can be further improved. In the present embodiment, the degree of glossiness refers to a value measured based on ASTM-D523 at a measurement angle of 60°. The degree of glossiness can be measured using a digital gloss meter (20°, 60°) (GM-26 model, manufactured by MURAKAMI COLOR RESEARCH LABORATORY CO., Ltd.), for example.

It is unclear why the metal-resin composite body 100 in which the bond strength is further improved is obtained when the degree of glossiness is within the above range. However, presumably, that is because the bonding surface 103 bonded to the resin member 101 has a more complicated surface structure by which the anchor effect between the resin member 101 and the metal member 102 can be more strongly exhibited.

The metal material constituting the metal member 102 is not particularly limited. From the viewpoint of ease of availability or price, examples thereof include steel, stainless steel, aluminum, an aluminum alloy, magnesium, a magnesium alloy, copper, a copper alloy, and the like. One kind of these may be used singly, or two or more kinds thereof may be used in combination. Among these, aluminum and an aluminum alloy are preferable because these are light and have a high strength.

The shape of the metal member 102 is not particularly limited as long as it has the bonding surface 103 to be bonded to the resin member 101. For example, the metal member 102 can have a sheet shape, a flat plate shape, a curved plate shape, a rod shape, a cylindrical shape, a lump shape, and the like. Furthermore, the metal member 102 may be a structure having these shapes in combination. The metal member 102 having the above shape can be obtained by processing the aforementioned metal material by a known processing method.

The shape of the bonding surface 103 to be bonded to the resin member 101 is not particularly limited, and examples thereof include a flat surface, a curved surface, and the like.

The thickness of the metal member 102 is not particularly limited because it is appropriately set according to the use of the metal-resin composite body 100. The thickness is generally equal to or greater than 0.01 mm, and preferably equal to or greater than 0.1 mm. The upper limit of the thickness of the metal member 102 is not particularly limited, but is equal to or less than 50 mm, for example.

Next, the method for forming the roughened layer 104 on the surface of the metal member 102 will be described.

The roughened layer 104 can be formed by chemically treating the surface of the metal member 102 by using a surface treatment agent, for example.

The process of chemically treating the surface of the metal member 102 by using a surface treatment agent has also been carried out in the related art. However, the inventors of the present invention found that by highly controlling factors such as (1) the combination of the metal member and the surface treatment agent, (2) the temperature and time of the chemical treatment, and (3) the post-treatment for the surface of the metal member having undergone the chemical treatment, the roughened layer 104 which enables the filler (B) to be present in the depression portions 201 can be obtained. In order to obtain the roughened layer 104 that can further improve the bond strength between the resin member 101 and the metal member 102, it is particularly important to highly control these factors.

An example of the method for forming the roughened layer 104 on the surface of the metal member 102 will be described below, but the method for forming the roughened layer 104 according to the present embodiment is not limited to the following example.

First, (1) the combination of the metal member and the surface treatment agent is selected.

In a case where a metal member constituted with steel or stainless steel is used, as the surface treatment agent, it is preferable to select an aqueous solution obtained by combining an inorganic acid, a source of chlorine ions, a source of copper (II) ions, and a thiol-based compound are combined as necessary.

In a case where a metal member constituted with aluminum or an aluminum alloy is used, as the surface treatment agent, it is preferable to select an aqueous solution obtained by combining a source of alkali, a source of amphoteric metal ions, a source of nitrate ions, and a thio compound as necessary.

In a case where a metal member constituted with magnesium or a magnesium alloy is used, as the surface treatment agent, a source of alkali is used, and it is particularly preferable to select an aqueous solution of sodium hydroxide.

In a case where a metal member constituted with copper or a copper alloy is used, as the surface treatment agent, it is preferable to select an aqueous solution using at least one kind of component selected from the group consisting of an inorganic acid such as nitric acid or sulfuric acid, an organic acid such as unsaturated carboxylic acid, persulfate, hydrogen peroxide, azoles such as imidazole and a derivative thereof, tetrazole and a derivative thereof, aminotetrazole and a derivative thereof, and aminotriazole and a derivative thereof, a pyridine derivative, triazine, a triazine derivative, alkanolamine, an alkylamine derivative, polyalkylene glycol, sugar alcohol, a source of copper (II) ions, a source of chorine ions, a phosphonic acid-based chelating agent oxidant, and N,N-bis(2-hydroxyethyl)-N-cyclohexylamine.

Then, (2) the metal member is dipped into the surface treatment agent such that the surface of the metal member is chemically treated. At this time, the treatment temperature is 30° C., for example. The treatment time is appropriately determined according to the material or surface condition of the selected metal member, the type or concentration of the surface treatment agent, the treatment temperature, and the like. The treatment time is, for example, 30 seconds to 300 seconds. At this time, it is important that an etching amount in the depth direction of the metal member is preferably set to be equal to or greater than 3 µm and more preferably set to be equal to or greater than 5 µm. The etching amount in the depth direction of the metal member can be evaluated by being calculated from the weight, specific gravity, and surface area of the dissolved metal member. The etching amount in the depth direction can be adjusted by the type or concentration of the surface treatment agent, the treatment temperature, the treatment time, and the like.

In the present embodiment, by adjusting the etching amount in the depth direction, the thickness of the roughened layer 104, the average depth of the depression portion 201, the specific surface area, the degree of glossiness, Ra, Rz, and the like described above can be adjusted.

Finally, (3) the surface of the metal member having undergone the chemical treatment is subjected to a post-treatment. First, the surface of the metal member is washed with water and dried. Then, the surface of the metal member having undergone the chemical treatment is treated with an aqueous nitric acid solution or the like.

By the above procedure, the metal member 102 having the roughened layer 104 according to the present embodiment can be obtained.

<Resin Member>

Next, the resin member 101 according to the present embodiment will be described.

The resin member 101 is obtained by curing the thermosetting resin composition (P) containing the thermosetting resin (A) and the filler (B).

As the thermosetting resin (A), for example, a phenol resin, an epoxy resin, an unsaturated polyester resin, a diallyl phthalate resin, a melamine resin, an oxetane resin, a maleimide resin, an urea resin, a polyurethane resin, a silicone resin, a resin having an benzoxazine ring, or a cyanate ester resin is used. One kind of these may be used singly, or two or more kinds thereof may be used in combination.

Among these, a phenol resin excellent in heat resistance, processability, mechanical characteristics, electric characteristics, adhesiveness, and abrasion resistance is preferably used.

When the total content of the resin member 101 is 100% by mass, the content of the thermosetting resin (A) is preferably equal to or greater than 15% by mass and equal to or less than 60% by mass, and more preferably equal to or greater than 25% by mass and equal to or less than 50% by mass.

Examples of the phenol resin include a novolac-type phenol resin such as a phenol novolac resin, a cresol novolac resin, or a bisphenol A-type novolac resin; a resol-type phenol resin such as a methylol-type resol resin, a dimethylene ether-type resol resin, or an oil-melted resol phenol resin melted using tong oil, linseed oil, walnut oil, or the like; an arylalkylene-type phenol resin; and the like. One kind of these may be used singly, or two or more kinds thereof may be used in combination.

Among these, a novolac-type phenol resin is preferable because it is excellent in ease of availability, is inexpensive, and exhibits excellent workability at the time of roll kneading.

In a case where the novolac-type phenol resin is used as the phenol resin, generally, hexamethylenetetramine is used as a curing agent. The hexamethylenetetramine is not particularly limited, but the amount thereof used is preferably 10 parts by mass to 25 parts by mass, and more preferably 13 parts by mass to 20 parts by mass, with respect to 100 parts by mass of the novolac-type phenol resin. When the amount of the hexamethylenetetramine used is equal to or greater than the lower limit described above, the curing time at the time of molding can be shortened. When the amount of the hexamethylenetetramine used is equal to or less than the upper limit described above, the appearance of the molded article can be improved.

From the viewpoint of improving the mechanical strength of the resin member 101, the thermosetting resin composition (P) contains the filler (B). Here, in the present embodiment, an elastomer (D), which will be described later, is not included in the filler (B).

When the total content of the resin member 101 is 100% by mass, the content of the filler (B) is preferably equal to or greater than 30% by mass and equal to or less than 80% by mass, and more preferably equal to or greater than 40% by mass and equal to or less than 70% by mass. When the content of the filler (B) is within the above range, it is possible to improve the workability of the thermosetting resin composition (P) and to further improve the mechanical strength of the obtained resin member 101. As a result, it is possible to obtain the metal-resin composite body 100 in which the bond strength between the resin member 101 and the metal member 102 is further improved. Furthermore, by adjusting the type or content of the filler (B), the value of a coefficient of linear expansion $\alpha_R$ of the obtained resin member 101 can be adjusted.

Examples of the filler (B) include a fibrous filler, a granular filler, a plate-like filler, and the like. Herein, the fibrous filler is a filler having a fibrous shape. The plate-like filler is a filler having a plate-like shape. The granular filler is a filler whose shape is different from the shape of fibrous and plate-like filler including an amorphous filler.

Examples of the fibrous filler include a fibrous inorganic filler such as glass fiber, carbon fiber, asbestos fiber, metal fiber, wollastonite, attapulgite, sepiolite, rock wool, aluminum borate whiskers, potassium titanate fiber, calcium carbonate whiskers, titanium oxide whiskers, or ceramic fiber; and a fibrous organic filler such as aramide fiber, polyimide fiber, and poly-p-phenylene benzobisoxazole fiber. One kind of these may be used singly, or two or more kinds thereof may be used in combination.

Examples of the plate-like filler and the granular filler include talc, kaolin clay, calcium carbonate, zinc oxide, calcium silicate hydrate, mica, glass flake, glass powder, magnesium carbonate, silica, titanium oxide, alumina, aluminum hydroxide, magnesium hydroxide, barium sulfate, calcium sulfate, calcium sulfite, zinc borate, barium metaborate, aluminum borate, calcium borate, sodium borate, aluminum nitride, boron nitride, silicon nitride, those obtained by pulverizing the above fibrous fillers, and the like. One kind of these may be used singly, or two or more kinds thereof may be used in combination.

When the total content of the filler (B) is 100% by mass, the filler (B) contains a filler (B1) whose average particle size in a weight-based particle size distribution measured by a laser diffraction and scattering-type particle size distribution analysis method is greater than 5 µm, preferably in an amount of equal to or greater than 70% by mass and equal to or less than 99% by mass, and more preferably in an amount of equal to or greater than 85% by mass and equal to or less than 98% by mass. When the filler (B) contains the filler (B1) in the amount described above, it is possible to improve the workability of the thermosetting resin composition (P) and to further improve the mechanical strength of the obtained resin member 101. The upper limit of the average particle size of the filler (B1) is not particularly limited, but is equal to or less than 100 µm, for example.

It is more preferable that the filler (B) contains, as the filler (B1), a fibrous filler or a plate-like filler having an average major axis length of equal to or greater than 5 µm and equal to or less than 50 mm and an average aspect ratio of equal to or greater than 1 and equal to or less than 1,000.

The average major axis length and the average aspect ratio of the filler (B1) can be measured using an SEM image as below. First, by using a scanning electron microscope, a plurality of fibrous fillers or plate-like fillers is imaged. From the images observed, 50 fibrous fillers or plate-like fillers are randomly selected, and a major axis length (fiber length in a case of fibrous filler or a major axis size in a plane direction in a case of plate-like filler) and a minor axis length (fiber diameter in a case of fibrous filler or the size in the thickness direction in a case of plate-like filler) of each of the fillers are measured. All of the major axes are added up and divided by 50, thereby obtaining the average major axis length. Similarly, all of the minor axes are added up and divided by 50, thereby obtaining the average minor axis length. Furthermore, a ratio of the average major axis length to the average minor axis length is determined as the average aspect ratio.

As the filler (B1), one kind of filler or two or more kinds of filler selected from glass fiber, carbon fiber, glass beads, and calcium carbonate are more preferable. When such a filler (B1) is used, the mechanical strength of the resin member 101 can be particularly improved.

When the total content of the filler (B) is 100% by mass, the filler (B) contains a filler (B2) whose average particle size in a weight-based particle size distribution measured by a laser diffraction and scattering-type particle size distribution analysis method is equal to or greater than 0.1 µm and equal to or less than 5 µm, preferably in an amount of equal to or greater than 1% by mass and equal to or less than 30% by mass, and more preferably in an amount of equal to or greater than 2% by mass and equal to or less than 15% by mass. When the filler (B) contains the filler (B2) in the amount described above, it is possible to cause a sufficient amount of filler (B) to be present in the depression portions 201. As a result, it is possible to further improve the mechanical strength of the region in which the resin member 101 and the metal member 102 permeate to each other.

It is more preferable that the filler (B) contains, as the filler (B2), a fibrous filler or a plate-like filler having an average major axis length, which is preferably equal to or greater than 0.1 µm and equal to or less than 100 µm and more preferably equal to or greater than 0.2 µm and equal to or less than 50 µm, and an average aspect ratio which is preferably equal to or greater than 1 and equal to or less than 50 and more preferably equal to or greater than 1 and equal to or less than 40.

The average major axis length and the average aspect ratio of the filler (B2) can be measured using an SEM image as below. First, by using a scanning electron microscope, a plurality of fibrous fillers or plate-like fillers is imaged. From the images observed, 50 fibrous fillers or plate-like fillers are randomly selected, and a major axis length (fiber length in a case of fibrous filler or a major axis size in a plane direction in a case of plate-like filler) and a minor axis length (fiber diameter in a case of fibrous filler or the size in the thickness direction in a case of plate-like filler) of each of the fillers are measured. All of the major axes are added up and divided by 50, thereby obtaining the average major axis length. Similarly, all of the minor axes are added up and divided by 50, thereby obtaining the average minor axis length. Furthermore, a ratio of the average major axis length to the average minor axis length is determined as the average aspect ratio.

As the filler (B2), one kind of filler or two or more kinds of filler selected from wollastonite, kaolin clay, talc, calcium carbonate, zinc oxide, calcium silicate hydrate, aluminum borate whiskers, and potassium titanate fiber are more preferable.

The surface of the filler (B) may be treated with a coupling agent such as a silane coupling agent (C) which will be described later.

The thermosetting resin composition (P) may further contain the silane coupling agent (C). When it contains the silane coupling agent (C), the adhesiveness between the resin member 101 and the metal member 102 can be further improved. Furthermore, when the thermosetting resin composition (P) contains the silane coupling agent (C), the affinity between the thermosetting resin (A) and the filler (B) can be improved, and hence the mechanical strength of the resin member 101 can be further improved.

The content of the silane coupling agent (C) is not particularly limited because it depends on the specific surface area of the filler (B). The content of the silane coupling agent (C) is preferably equal to or greater than 0.01 parts by mass and equal to or less than 4.0 parts by mass, and more preferably equal to or greater than 0.1 parts by mass and equal to or less than 1.0 part by mass, with respect to 100 parts by mass of the filler (B). When the content of the silane coupling agent (C) is within the above range, it is possible to sufficiently coat the filler (B) and to further improve the mechanical strength of the resin member 101.

Examples of the silane coupling agent (C) include an epoxy group-containing alkoxysilane compound such as γ-glycidoxypropyl trimethoxysilane, γ-glycidoxypropyl triethoxysilane, or β-(3,4-epoxycyclohexyl)ethyl trimethoxysilane; a mercapto group-containing alkoxysilane compound such as γ-mercaptopropyl trimethoxysilane or γ-mercaptopropyl triethoxysilane; a ureido group-containing alkoxysilane compound such as γ-ureidopropyl triethoxysilane, γ-ureidopropyl trimethoxysilane, or γ-(2-ureidoethyl)aminopropyl trimethoxysilane; an isocyanato group-containing alkoxysilane compound such as γ-isocyanatopropyl triethoxysilane, γ-isocyanatopropyl trimethoxysilane, γ-isocyanatopropylmethyl dimethoxysilane, γ-isocyanatopropylmethyl diethoxysilane, γ-isocyanatopropylethyl dimethoxysilane, γ-isocyanatopropylethyl diethoxysilane, or γ-isocyanatopropyl trichlorosilane; an amino group-containing alkoxysilane compound such as γ-aminopropyl triethoxysilane, γ-(2-aminoethyl)aminopropylmethyl dimethoxysilane, γ-(2-aminoethyl)aminopropyl trimethoxysilane, or γ-aminopropyl trimethoxysilane; a hydroxyl group-containing alkoxysilane compound such as γ-hydroxypropyl trimethoxysilane or γ-hydroxypropyl triethoxysilane; and the like.

One kind of these may be used singly, or two or more kinds of these may be used in combination.

From the viewpoint of improving the toughness of the resin member 101, the thermosetting resin composition (P) according to the present embodiment may further contain an elastomer (D). Here, in the present embodiment, the filler (B) is not included in the elastomer (D).

When the total content of the resin member 101 is 100% by mass, the content of the elastomer (D) is preferably equal to or greater than 1% by mass and equal to or less than 10% by mass, and more preferably equal to or greater than 1.5% by mass and equal to or less than 7% by mass. When the content of the elastomer (D) is within the above range, it is possible to further improve the toughness of the resin member 101 while maintaining the mechanical strength of the resin member 101. As a result, it is possible to obtain the metal-resin composite body 100 in which the bond strength between the resin member 101 and the metal member 102 is further improved.

Examples of the elastomer (D) include unmodified polyvinyl acetate, polyvinyl acetate modified with carboxylic acid, polyvinyl butyral, natural rubber, isoprene rubber, styrene-butadiene rubber, butadiene rubber, chloroprene rubber, butyl rubber, ethylene-propylene rubber, acryl rubber, styrene-isoprene rubber, acrylonitrile-butadiene rubber, urethane rubber, silicon rubber, and fluorine rubber. One kind of these may be used singly, or two or more kinds thereof may be used in combination. Among these, unmodified polyvinyl acetate, polyvinyl acetate modified with carboxylic acid, acryl rubber, acrylonitrile-butadiene rubber, and polyvinyl butyral are preferable. When these elastomers are used, the toughness of the resin member 101 can be particularly improved.

The method for manufacturing the thermosetting resin composition (P) is not particularly limited. Generally, the composition can be manufactured by a known method. For example, the following method can be used. First, the thermosetting resin (A), the filler (B), the silane coupling agent (C) which is used if necessary, the elastomer (D), a curing agent, an auxiliary curing agent, a release agent, a pigment, a flame retardant, a weatherproofing agent, an antioxidant, a plasticizer, a lubricant, a sliding agent, a foaming agent, and the like are formulated and uniformly mixed together. Then, the obtained mixture is heated, melted, and kneaded by one of kneading devices such as a roll, a kneader, and a double-screw extruder or by a combination of a roll with other kneading devices. Finally, the obtained mixture is made into particles or pulverized, thereby obtaining the thermosetting resin composition (P).

The coefficient of linear expansion $\alpha_R$ of the resin member 101 within a range of 25° C. to a glass transition temperature of the resin member 101 is preferably equal to or greater than 10 ppm/° C. and equal to or less than 50 ppm/° C., and more preferably equal to or greater than 15 ppm/° C. and equal to or less than 45 ppm/° C. When the coefficient of linear expansion $\alpha_R$ is within the above range, the reliability of temperature cycle of the metal-resin composite body 100 can be further improved.

The thickness of the resin member 101 is not particularly limited because it is appropriately set according to the use of the metal-resin composite body 100. The thickness is generally equal to or greater than 0.05 mm, and preferably equal to or greater than 0.1 mm. The upper limit of the thickness of the resin member 101 is not particularly limited, but is equal to or less than 50 mm, for example.

<Metal-Resin Composite Body>

Next, the metal-resin composite body 100 according to the present embodiment will be described.

The metal-resin composite body 100 is obtained by bonding the resin member 101 and the metal member 102 to each other. The resin member 101 is obtained by curing the thermosetting resin composition (P) containing the thermosetting resin (A) and the filler (B). The metal member 102 has the roughened layer 104 including fine irregularities on at least the bonding surface 103 bonded to the resin member 101. In the depression portions 201 constituting the irregularities of the roughened layer 104, a portion of the filler (B) is present.

In the metal-resin composite body 100, the absolute value of a difference $(\alpha_R - \alpha_M)$ between a coefficient of linear expansion $\alpha_R$ of the resin member 101 within a range of 25° C. to a glass transition temperature of the resin member 101 and a coefficient of linear expansion c of the metal member 102 within a range of 25° C. to the glass transition temperature of the resin member 101 is preferably equal to or less than 25 ppm/° C., and more preferably equal to or less than 10 ppm/° C. When the difference between the coefficients of linear expansion is equal to or less than the upper limit described above, it is possible to suppress the thermal stress which occurs due to the difference of linear expansion when the metal-resin composite body 100 is exposed to a high temperature. Therefore, as long as the difference between the coefficients of linear expansion is equal to or less than the upper limit described above, it is possible to maintain the bond strength between the resin member 101 and the metal member 102 even at a high temperature. That is, as long as the difference of the coefficient of linear expansion is equal to or less than the upper limit described above, it is possible to improve the dimensional stability of the metal-resin composite body 100 at a high temperature.

In the present embodiment, in a case where the coefficients of linear expansion have anisotropy, the average thereof is indicated. For example, in a case where the resin member 101 has a sheet shape, when there is a difference between the coefficient of linear expansion in the flow direction (MD) and the coefficient of linear expansion in the direction (TD) perpendicular to MD, the average thereof is determined as the coefficient of linear expansion $\alpha_R$ of the resin member 101.

The metal-resin composite body 100 is not particularly limited, but is preferably a composite body in which the resin member 101 and the metal member 102 are directly bonded to each other without the aid of an adhesive. The resin member 101 and the metal member 102 have excellent bond strength even if an adhesive is not used. Therefore, the manufacturing process of the metal-resin composite body 100 can be simplified.

The adhesive refers to an adhesive known in the technical field of metal-resin composite body, and examples thereof include an epoxy-based adhesive and the like.

The average major axis length of the filler (B) present in the depression portions 201 that is determined by the analysis of an electron micrograph is preferably equal to or greater than 0.1 μm and equal to or less than 5.0 μm, and more preferably equal to or greater than 0.2 μm and equal to or less than 4 μm. When the average major axis length is within the above range, it is possible to further improve the mechanical strength of the region in which the resin member 101 and the metal member 102 permeate to each other.

The average aspect ratio of the filler (B) present in the depression portions 201 is preferably equal to or greater than 1 and equal to or less than 50, and more preferably equal to or greater than 1 and equal to or less than 40.

The average major axis length and the average aspect ratio of the filler (B) present in the depression portions 201 can be measured using an SEM image as below. First, by using a scanning electron microscope, a section of the roughened layer 104 is imaged. From the image observed, 50 fillers (B) present in the depression portions 201 are randomly selected, and a major axis length (fiber length in a case of fibrous filler or a major axis size in a plane direction in a case of plate-like filler) and a minor axis length (fiber diameter in a case of fibrous filler or the size in the thickness direction in a case of plate-like filler) of each of the fillers are measured. All of the major axes are added up and divided by 50, thereby obtaining the average major axis length. Similarly, all of the minor axes are added up and divided by 50, thereby obtaining the average minor axis length. Furthermore, a ratio of the average major axis length to the average minor axis length is determined as the average aspect ratio.

The filler (B) present in the depression portions 201 is preferably one kind of filler or two or more kinds of filler selected from the group consisting of wollastonite, kaolin clay, talc, calcium carbonate, zinc oxide, calcium silicate hydrate, aluminum borate whiskers, and potassium titanate fiber.

In a case where the resin member 101 contains the elastomer (D), the resin member 101 is preferably has a sea-island structure, and the elastomer (D) is preferably present in island phases.

When such a structure is adopted, it is possible to improve the toughness of the resin member 101 and to improve the impact resistance of the metal-resin composite body 100. As a result, even if an external impact is exerted on the metal-resin composite body 100, the bond strength between the resin member 101 and the metal member 102 can be maintained.

The sea-island structure can be observed using an electron micrograph.

The average diameter of the island phases that is determined through the image analysis performed on the electron micrograph is preferably equal to or greater than 0.1 μm and equal to or less than 100 μm, and more preferably equal to or greater than 0.2 μm and equal to or less than 30 μm. When the average diameter of the island phases is within the above range, it is possible to further improve the toughness of the resin member 101 and to further improve the impact resistance of the metal-resin composite body 100.

The average diameter of the island phases can be determined using an image of a scanning electron microscope (SEM) as below. First, by using a scanning electron microscope, a section of the resin member 101 is imaged. From the image observed, 50 island phases present in the resin member 101 are randomly selected, and the diameters of them are measured respectively. All of the diameters of the island phases are added up and divided by 50, thereby obtaining the average diameter.

The total thickness of the metal-resin composite body 100 is not particularly limited because it is appropriately set according to the use of the metal-resin composite body 100. The total thickness is generally equal to or greater than 0.06 mm, and preferably equal to or greater than 0.2 mm. The upper limit of the thickness of the metal-resin composite body 100 is not particularly limited, but is equal to or less than 100 mm, for example.

<Method for Manufacturing Metal-Resin Composite Body>

Next, the method for manufacturing the metal-resin composite body 100 will be described. The method for manufacturing the metal-resin composite body 100 is not particularly limited, and examples thereof include an injection molding method, a transfer molding method, a compression molding method, an injection and compression molding method, and the like. Among these, an injection molding method is particularly suitable.

The method for manufacturing the metal-resin composite body 100 includes the following steps, for example.

(1) A step of installing the metal member 102, which has the roughened layer 104 on at least the bonding surface 103 to be bonded to the resin member 101, in a mold 105.

(2) A step of bonding the resin member 101 composed of the thermosetting resin composition (P) to the metal member 102 by injecting the thermosetting resin composition (P) into the mold 105 and curing the thermosetting resin composition (P) in a state where at least a portion of the thermosetting resin composition (P) comes into contact with the bonding surface 103.

Figure 3:
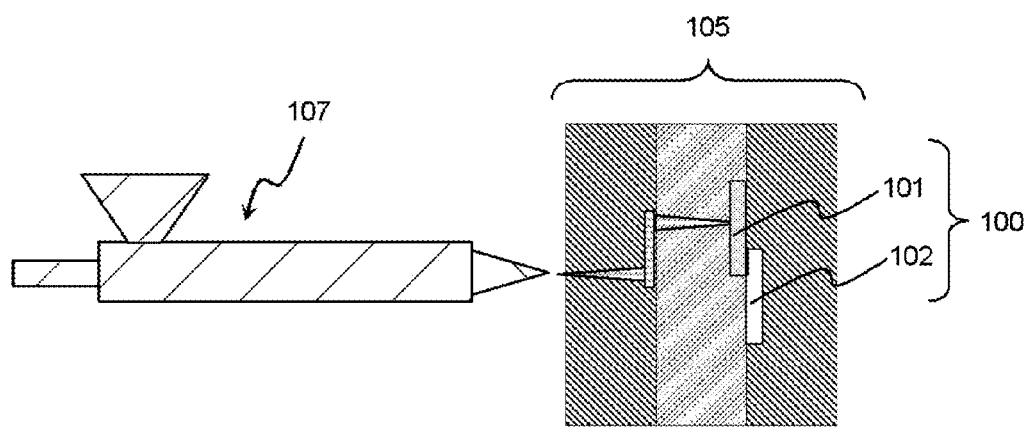
FIG. 3 is a sectional view schematically showing an example of a device for manufacturing a metal-resin composite body according to an embodiment of the present invention.

Hereinafter, regarding the method for manufacturing the metal-resin composite body 100, a case where an injection molding method is used will be described, for example. FIG. 3 is a sectional view schematically showing an example of a device for manufacturing the metal-resin composite body 100 according to an embodiment of the present invention.

First, the mold 105 is prepared, and the metal member 102 is installed in the mold 105. Then, by using an injection molding machine 107, the thermosetting resin composition (P) is injected into the mold 105, such that at least a portion of the thermosetting resin composition (P) comes into contact with the bonding surface 103 of the metal member 102. Thereafter, in a state where at least a portion of the thermosetting resin composition (P) comes into contact with the bonding surface 103, the thermosetting resin composition (P) is cured. Subsequently, the metal-resin composite body 100 is taken out of the mold 105, thereby obtaining the metal-resin composite body 100.

It is preferable that the thermosetting resin composition (P) has high fluidity such that molding is excellently performed. Therefore, a melt viscosity of the thermosetting resin composition (P) at 175° C. is preferably equal to or greater than 10 Pa·s and equal to or less than 3,000 Pa·s, and more preferably equal to or greater than 30 Pa·s and equal to or less than 2,000 Pa·s. The melt viscosity at 175° C. can be measured using a heat flow evaluator (flow tester) manufactured by Shimadzu Corporation, for example.

It is preferable that the thermosetting resin composition (P) shows the following viscosity behavior. When the thermosetting resin composition (P) is heated from 60° C. by using a dynamic viscoelasticity measurement instrument at a heating rate of 3° C./min and a frequency of 1 Hz such that the composition becomes in a molten state, the melt viscosity of the thermosetting resin composition (P) is reduced during the initial stage but increases after the composition reaches the lowest melt viscosity, and the lowest melt viscosity is within a range of equal to or greater than 10 Pa·s and equal to or less than 2,000 Pa·s.

When the lowest melt viscosity is equal to or greater than the lower limit described above, it is possible to inhibit a phenomenon in which the thermosetting resin (A) flows alone due to the separation between the thermosetting resin (A) and the filler (B), and to obtain a more homogeneous resin member 101.

When the lowest melt viscosity is equal to or less than the upper limit described above, the permeability of the thermosetting resin composition (P) into the depression portions 201 can be improved, and thus the filler (B) can be sufficiently supplied into the depression portions 201. As a result, it is possible to further improve the mechanical strength of the region in which the resin member 101 and the metal member 102 permeate to each other.

The temperature at which thermosetting resin composition (P) reaches the lowest melt viscosity is preferably within a range of equal to or higher than 100° C. and equal to or lower than 250° C.

When the thermosetting resin composition (P) shows the viscosity behavior described above, it is possible to inhibit the permeation of air into the thermosetting resin composition (P) at the time of forming the resin member 101 by heating and curing the thermosetting resin composition (P), and to thoroughly discharge air dissolved in the thermosetting resin composition (P) to the outside. As a result, it is possible to inhibit the generation of air bubbles in the resin member 101. By the inhibition of the generation of air bubbles, the mechanical strength of the resin member 101 can be further improved.

In order to realize the thermosetting resin composition (P) showing the viscosity behavior described above, for example, the type or amount of the thermosetting resin (A), the type or amount of the filler (B), and the type or amount of the elastomer (D) described above should be appropriately adjusted.

In the present embodiment, the molding conditions of the metal-resin composite body 100 are not particularly limited because they vary with the molding method employed. It is possible to employ the molding conditions that are generally known in regard to the molding method to be employed. In a case where an injection molding method is used as a molding method, for example, it is possible to employ the molding conditions of a temperature of 160° C. to 180° C., a pressure of 10 MPa to 30 MPa, and a curing time of 30 seconds to 5 minutes.

(Use)

The metal-resin composite body 100 according to the present embodiment has high productivity, and the shape thereof can be extremely freely controlled. Therefore, the metal-resin composite body 100 is extremely versatile. For example, the metal-resin composite body 100 can be used for aircraft parts, automobile parts, parts for electronic instruments, parts for home appliances, parts for industrial machines, and the like. It is preferable that the metal-resin composite body 100 according to the present embodiment is used for automobile parts.

Hitherto, the embodiments of the present invention have been described. However, the embodiments are merely examples of the present invention, and various constituents other than the above can be employed.

EXAMPLE

Hereinafter, the present embodiment will be specifically described with reference to examples and comparative examples, but the present embodiment is not limited to the description of the examples.

Example 1

Preparation of Thermosetting Resin Composition (P1)

34.0% by mass of a novolac-type phenol resin (PR-51305, manufactured by Sumitomo Bakelite Co., Ltd.), 6.0% by mass of hexamethylenetetramine, 52.0% by mass of glass fiber (CS3E479, manufactured by Nitto Boseki Co., Ltd., average particle size: 11 µm, average major axis length: 3 mm, average aspect ratio: 270), 6.0% by mass of wollastonite (manufactured by NYCO Minerals, Inc., trade name: NYAD5000, average particle size: 3 µm, average major axis length: 9 µm, average aspect ratio: 3), 0.2% by mass of γ-aminopropyl triethoxysilane (manufactured by Shin-Etsu chemical Co., Ltd., trade name: KBE-903), 0.5% by mass of magnesium oxide (manufactured by Konoshima Chemical Co., Ltd., trade name: STARMAG), and 1.3% by mass of other components such as a lubricant were subjected to dry mixing. The mixture was subjected to melt kneading using a heating role with a temperature of 90° C. such that the mixture is formed into a sheet, and the resultant was cooled and pulverized, thereby obtaining a granular thermosetting resin composition (P1).

(Viscosity Characteristics of Thermosetting Resin Composition (P1))

By using a flow characteristic evaluator (KOka-type flow tester, CFT-500D), a melt viscosity of the thermosetting resin composition (P1) at 175° C. was measured.

Furthermore, by using a rheometer MRC301 manufactured by Anton Paar Japan K.K, the thermosetting resin composition (P1) was heated to 200° C. from 60° C. at a heating rate of 3° C./min and a frequency of 1 Hz. From the obtained viscosity profile, the lowest melt viscosity and the temperature at which the composition reached the lowest melt viscosity were determined.

<Surface Treatment for Metal Member>

As an aluminum alloy sheet having not yet been subjected to surface treatment, an A5052 aluminum alloy sheet A (80 mm×10 mm, thickness: 1.0 mm) whose surface was sufficiently polished with #4000 polishing paper was prepared.

An aqueous solution of potassium hydroxide (16% by mass), zinc chloride (5% by mass), sodium nitrate (5% by mass), and sodium thiosulfate (13% by mass) was prepared. The aluminum alloy sheet A was dipped into the obtained aqueous solution (30° C.) and shaken, thereby dissolving the aluminum alloy sheet by 15 µm (calculated from the reduced weight of aluminum) in the depth direction. Then, the aluminum alloy sheet A was washed with water, dipped into 35% by mass of an aqueous nitric acid solution (30° C.), and shaken for 20 seconds. Thereafter, the aluminum alloy sheet A was washed with water and dried, thereby obtaining an aluminum alloy sheet 1.

<Method for Evaluating Metal Member>

(Measuring Surface Roughness of Metal Member)

By using a super-depth profile measuring microscope (VK9700 manufactured by KEYENCE CORPORATION), the surface shape of the bonding surface of the metal member that was bonded to the resin member was measured at 20× magnification. At this time, the surface roughness Ra and Rz were measured based on JIS-B0601.

Ra and Rz of the aluminum alloy sheet 1 were 4.0 μm and 15.5 μm respectively.

(Measuring Specific Surface Area)

The sample to be measured was dried in a vacuum for 6 hours at 120° C. Then, by using an automatic specific surface area/pore distribution analyzer (BELSORPmini II manufactured by BEL Japan, Inc.), the amount of nitrogen adsorbed onto and desorbed from the sample at the temperature of liquid nitrogen was measured. The actual surface area based on the nitrogen adsorption BET method was calculated from the BET plot. The actual surface area measured by the nitrogen adsorption BET method was divided by the apparent surface area, thereby calculating the specific surface area.

The specific surface area of the aluminum alloy sheet 1 was 270.

(Measuring Degree of Glossiness of Surface of Metal Member)

The degree of glossiness of the surface of the metal member was measured based on ASTM-D523 at a measurement angle of 60° by using a digital gloss meter (20°, 60°) (GM-26 model, manufactured by MURAKAMI COLOR RESEARCH LABORATORY CO., Ltd.).

The degree of glossiness of the aluminum alloy sheet 1 was 10.

(Observing Surface of Metal Member)

Figure 4:
FIG. 4 is a view showing an electron micrograph showing an enlarged view of a roughened layer present on the surface of an aluminum alloy sheet obtained in Example 1.

The surface of the metal member was imaged using an electron microscope (SEM), and the structure of the roughened layer present on the surface of the metal member was observed. FIG. 4 is an electron micrograph showing an enlarged view of the roughened layer present on the surface of the aluminum alloy sheet 1 obtained in Example 1. Through the observation, the thickness of the roughened layer, the sectional shape of the depression portion, the average depth of the depression portion, and the average section width of the opening portion were determined.

The thickness of the roughened layer of the aluminum alloy sheet 1 was 15 μm, the average depth of the depression portion was 13 μm, and the average section width of the opening portion was 14 μm. Furthermore, as shown in FIG. 4, the depression portion had such a sectional shape that, between the opening portion and the bottom portion of the depression portion, there is at least a portion whose section width is greater than the section width of the opening portion.

(Measuring Coefficient of Linear Expansion $\alpha_M$)

By using a thermomechanical analyzer TMA (manufactured by TA Instruments, EXSTAR 6000), a coefficient of linear expansion $\alpha_M$ within a range of 25° C. to the glass transition temperature of the resin member was measured under a compression condition of 5° C./min. The coefficient of linear expansion $\alpha_M$ of the aluminum alloy sheet 1 was 23 ppm/° C.

<Preparation of Metal-Resin Composite Body>

By using the obtained thermosetting resin composition (P1) and the aluminum alloy sheet 1, a metal-resin composite body 1 was prepared. Specifically, the composite body was prepared according to the following procedure.

First, the aluminum alloy sheet 1 having a thickness of 1 mm was disposed in a mold. Then, the thermosetting resin composition (P1) was heated such that the thickness thereof became 3 mm after curing, and the composition was injected in a predetermined amount into the mold. Finally, the thermosetting resin composition (P1) was cured by compression molding, thereby obtaining the metal-resin composite body 1 consisting of two layers composed of a resin member sheet having a thickness of 3 mm and the aluminum alloy sheet 1 having a thickness of 1 mm. The metal-resin composite body 1 was named a test piece 1. Herein, the compression molding was performed under the conditions of an effective pressure of 20 MPa, a mold temperature of 175° C., and a curing time of 3 minutes.

(Observing Bonding Portion of Metal-Resin Composite Body)

Figure 5:
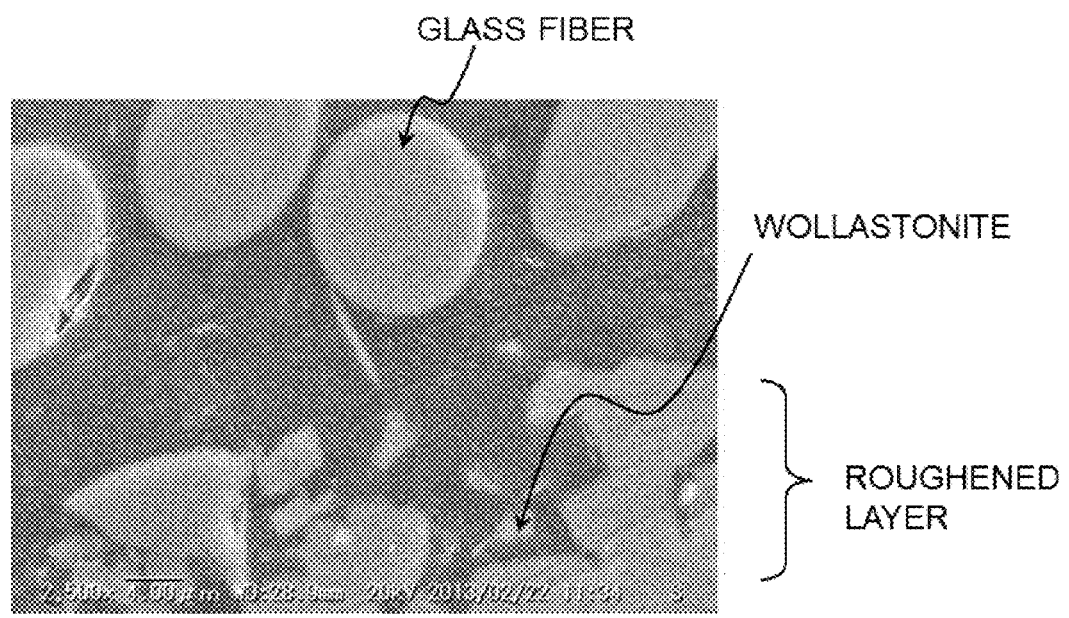
FIG. 5 is a view showing an electron micrograph showing an enlarged view of a section of a bonding portion of a metal-resin composite body obtained in Example 1.

The section of the bonding portion of the metal-resin composite body 1 was imaged using an electron microscope (SEM), and the structure of the section of the bonding portion was observed. FIG. 5 is an electron micrograph showing an enlarged view of the section of the bonding portion of the metal-resin composite body 1 obtained in Example 1. Through the observation, whether or not the filler was present in the depression portions and the average major axis length and average aspect ratio of the filler present in the depression portions were determined. Herein, whether or not the filler was present in the depression portions was also confirmed through energy dispersive X-ray fluorescence spectroscopy.

(Bending Strength)

The bending strength of the obtained test piece 1 was measured in an atmosphere with a temperature of 25° C. based on JIS K6911. At this time, the bending strength was tested in a state where the aluminum alloy sheet 1 was disposed at the lower side. Herein, the unit of the bending strength is "MPa".

(Test for Tensile Shearing Strength)

Based on JIS K6850, the tensile shearing strength of the obtained test piece 1 was measured in an atmosphere with a temperature of 25° C. Herein, the unit of the tensile shearing strength is "MPa".

(Measuring Coefficient of Linear Expansion $\alpha_R$)

By using a thermomechanical analyzer TMA (manufactured by TA Instruments, EXSTAR 6000), a coefficient of linear expansion $\alpha_R$ of the resin member sheet within a range of 25° C. to the glass transition temperature of the resin member sheet was measured under a compression conditions of 5° C./min. The coefficient of linear expansion $\alpha_R$ of the resin member sheet having a thickness of 3 mm composed of the thermosetting resin composition (P1) was 17 ppm/° C. in the flow direction and 47 ppm/° C. in a direction perpendicular to the flow direction. Furthermore, the average of the coefficient $\alpha_R$ was 32 ppm/° C. Therefore, a difference between the coefficients of linear expansion ($\alpha_R - \alpha_M$) was 9 ppm/° C.

Example 2

A metal-resin composite body 2 was prepared by the same method as in Example 1, except that the following thermosetting resin composition (P2) was used instead of the thermosetting resin composition (P1). The metal-resin composite body 2 was named a test piece 2 and evaluated in the same manner as in Example 1.

34.0% by mass of a novolac-type phenol resin (PR-51305, manufactured by Sumitomo Bakelite Co., Ltd.), 6.0% by mass of hexamethylenetetramine, 52.0% by mass of glass fiber (CS3E479, manufactured by Nitto Boseki Co., Ltd., average particle size: 11 μm, average major axis length: 3 mm, average aspect ratio: 270), 6.0% by mass of calcium silicate hydrate (manufactured by Ube Material Industries, Ltd., ZONO-HIGE, average particle size: 0.4 μm, average major axis length: 4 μm, average aspect ratio: 10), 0.2% by mass of γ-aminopropyl triethoxysilane (manufactured by Shin-Etsu Chemical Co., Ltd., trade name: KBE-903), 0.5% by mass of magnesium oxide (manufactured by Konoshima Chemical Co., Ltd., trade name: STARMAG), and 1.3% by mass of other components such as a lubricant were subjected to dry mixing. The mixture was subjected to melt kneading using a heating role with a temperature of 90° C. such that the mixture is formed into a sheet, and the resultant was cooled and pulverized, thereby obtaining a granular thermosetting resin composition (P2).

The coefficient of linear expansion $\alpha_R$ of the resin member sheet having a thickness of 3 mm composed of the thermosetting resin composition (P2) was 18 ppm/° C. in the flow direction and 46 ppm/° C. in a direction perpendicular thereto, and the average of the coefficient $\alpha_R$ was 32 ppm/° C. Therefore, a difference between the coefficients of linear expansion ($\alpha_R - \alpha_M$) was 9 ppm/° C.

Example 3

A metal-resin composite body 3 was prepared by the same method as in Example 1, except that the following thermosetting resin composition (P3) was used instead of the thermosetting resin composition (P1). The metal-resin composite body 3 was named a test piece 3 and evaluated in the same manner as in Example 1.

Furthermore, a section of the resin member was imaged using an electron microscope (SEM), and the structure of the section of the resin member was observed. From the obtained SEM image, whether or not a sea-island structure was present was confirmed, and the average diameter of island phases was determined.

32.0% by mass of a novolac-type phenol resin (PR-51305, manufactured by Sumitomo Bakelite Co., Ltd.), 6.0% by mass of hexamethylenetetramine, 52.0% by mass of glass fiber (CS3E479, manufactured by Nitto Boseki Co., Ltd., average particle size: 11 μm, average major axis length: 3 mm, average aspect ratio: 270), 6.0% by mass of wollastonite (manufactured by NYCO Minerals, Inc., trade name: NYAD5000, average particle size: 3 μm, average major axis length: 9 μm, average aspect ratio: 3), 2.0% by mass of acrylonitrile-butadiene rubber (manufactured by JSR Corporation, trade name: PNC-38), 0.2% by mass of γ-aminopropyl triethoxysilane (manufactured by Shin-Etsu Chemical Co., Ltd., trade name: KBE-903), 0.5% by mass of magnesium oxide (manufactured by Konoshima Chemical Co., Ltd., trade name: STARMAG), and 1.3% by mass of other components such as a lubricant were subjected to dry mixing. The mixture was subjected to melt kneading using a heating role with a temperature of 90° C. such that the mixture is formed into a sheet, and the resultant was cooled and pulverized, thereby obtaining a granular thermosetting resin composition (P3).

The coefficient of linear expansion $\alpha_R$ of the resin member sheet having a thickness of 3 mm composed of the thermosetting resin composition (P3) was 16 ppm/° C. in the flow direction and 45 ppm/° C. in a direction perpendicular thereto, and the average of the coefficient $\alpha_R$ was 31 ppm/° C. Therefore, a difference between the coefficients of linear expansion ($\alpha_R - \alpha_M$) was 8 ppm/° C.

Example 4

A metal-resin composite body 4 was prepared by the same method as in Example 1, except that the following thermosetting resin composition (P4) was used instead of the thermosetting resin composition (P1). The metal-resin composite body 4 was named a test piece 4 and evaluated in the same manner as in Example 1.

28.0% by mass of a resol-type phenol resin (manufactured by Sumitomo Bakelite Co., Ltd., PR-513723), 8.0% by mass of novolac-type phenol resin (PR-51305, manufactured by Sumitomo Bakelite Co., Ltd.), 55.0% by mass of glass fiber (CS3E479, manufactured by Nitto Boseki Co., Ltd., average particle size: 11 μm, average major axis length: 3 mm, average aspect ratio: 270), 6.0% by mass of wollastonite (manufactured by NYCO Minerals, Inc., trade name: NYAD5000, average particle size: 3 μm, average major axis length: 9 μm, average aspect ratio: 3), 0.2% by mass of γ-aminopropyl triethoxysilane (manufactured by Shin-Etsu Chemical Co., Ltd., trade name: KBE-903), 1.0% by mass of auxiliary curing agent (slaked lime), and 1.8% by mass of other components such as a lubricant were subjected to dry mixing. The mixture was subjected to melt kneading using a heating role with a temperature of 90° C. such that the mixture is formed into a sheet, and the resultant was cooled and pulverized, thereby obtaining a granular thermosetting resin composition (P4).

The coefficient of linear expansion $\alpha_R$ of the resin member sheet having a thickness of 3 mm composed of the thermosetting resin composition (P4) was 19 ppm/° C. in the flow direction and 45 ppm/° C. in a direction perpendicular thereto, and the average of the coefficient $\alpha_R$ was 32 ppm/° C. Therefore, a difference between the coefficients of linear expansion ($\alpha_R - \alpha_M$) was 9 ppm/° C.

Example 5

A metal-resin composite body 5 was prepared by the same method as in Example 1, except that the following thermosetting resin composition (P5) was used instead of the thermosetting resin composition (P1). The metal-resin composite body 5 was named a test piece 5 and evaluated in the same manner as in Example 1.

Furthermore, a section of the resin member was imaged using an electron microscope (SEM), and the structure of the section of the resin member was observed. From the obtained SEM image, whether or not a sea-island structure was present was confirmed, and the average diameter of island phases was determined.

28.0% by mass of resol-type phenol resin (manufactured by Sumitomo Bakelite Co., Ltd., PR-513723), 8.0% by mass of a novolac-type phenol resin (PR-51305, manufactured by Sumitomo Bakelite Co., Ltd.), 55.0% by mass of glass fiber (CS3E479, manufactured by Nitto Boseki Co., Ltd., average particle size: 11 μm, average major axis length: 3 mm, average aspect ratio: 270), 3.0% by mass of unbaked clay (manufactured by ECC, ECKALITE1, average particle size: 0.4 μm, average major axis length: 8 μm, average aspect ratio: 20), 0.2% by mass of γ-aminopropyl triethoxysilane (manufactured by Shin-Etsu Chemical Co., Ltd., trade name: KBE-903) 2.0% by mass of acrylonitrile-butadiene rubber (manufactured by JSR Corporation, trade name: PNC-38), 1.0% by mass of an auxiliary curing agent (slaked lime), and 2.8% by mass of other components such as a lubricant were subjected to dry mixing. The mixture was subjected to melt kneading using a heating role with a temperature of 90° C. such that the mixture is formed into a sheet, and the resultant was cooled and pulverized, thereby obtaining a granular thermosetting resin composition (P5).

The coefficient of linear expansion $\alpha_R$ of the resin member sheet having a thickness of 3 mm composed of the thermosetting resin composition (P5) was 22 ppm/° C. in the flow direction and 43 ppm/° C. in a direction perpendicular thereto, and the average of the coefficient $\alpha_R$ was 32 ppm/° C. Therefore, a difference between the coefficients of linear expansion ($\alpha_R - \alpha_M$) was 9 ppm/° C.

Example 6

A metal-resin composite body 6 was prepared by the same method as in Example 1, except that the following aluminum alloy sheet 2 was used instead of the aluminum alloy sheet 1. The metal-resin composite body 6 was named a test piece 6 and evaluated in the same manner as in Example 1.

An aqueous solution of potassium hydroxide (16% by mass), zinc chloride (5% by mass), sodium nitrate (5% by mass), and sodium thiosulfate (13% by mass) was prepared. The aluminum alloy sheet A was dipped into the obtained aqueous solution (30° C.) and shaken, thereby dissolving the aluminum alloy sheet A by 30 μm (calculated from the reduced weight of aluminum) in the depth direction. Then, the aluminum alloy sheet A was washed with water, dipped into 35% by mass of an aqueous nitric acid solution (30° C.), and shaken for 20 seconds. Thereafter, the aluminum alloy sheet A was washed with water and dried, thereby obtaining an aluminum alloy sheet 2.

The characteristics of the aluminum alloy sheet 2 were as follows.
Ra: 4.0 μm
Rz: 29.0 μm
Specific surface area: 290
Degree of glossiness: 9
Thickness of roughened layer: 30 μm
Average depth of depression portion: 28 μm
Average section width of opening portion: 5 μm
Coefficient of linear expansion $\alpha_M$: 23 ppm/° C.

Furthermore, the depression portion had such a sectional shape that, between the opening portion and the bottom portion of the depression portion, there is at least a portion whose section width is greater than the section width of the opening portion.

Example 7

A metal-resin composite body 7 was prepared by the same method as in Example 1, except that the following aluminum alloy sheet 3 was used instead of the aluminum alloy sheet 1. The metal-resin composite body 7 was named a test piece 7 and evaluated in the same manner as in Example 1.

An aqueous solution of potassium hydroxide (16% by mass), zinc chloride (5% by mass), sodium nitrate (5% by mass), and sodium thiosulfate (13% by mass) was prepared. The aluminum alloy sheet A was dipped into the obtained aqueous solution (30° C.) and shaken, thereby dissolving the aluminum alloy sheet A by 4 μm (calculated from the reduced weight of aluminum) in the depth direction. Then, the aluminum alloy sheet A was washed with water, dipped into 35% by mass of an aqueous nitric acid solution (30° C.), and shaken for 20 seconds. Thereafter, the aluminum alloy sheet A was washed with water and dried, thereby obtaining an aluminum alloy sheet 3.

The characteristics of the aluminum alloy sheet 3 were as follows.
Ra: 1.0 μm
Rz: 4.0 μm
Specific surface area: 160
Degree of glossiness: 8
Thickness of roughened layer: 4 μm
Average depth of depression portion: 3.5 μm
Average section width of opening portion: 3 μm
Coefficient of linear expansion $\alpha_M$: 23 ppm/° C.

Furthermore, the depression portion had such a sectional shape that, between the opening portion and the bottom portion of the depression portion, there is at least a portion whose section width is greater than the section width of the opening portion.

Comparative Example 1

A metal-resin composite body 8 was prepared by the same method as in Example 1, except that the following thermosetting resin composition (P6) was used instead of the thermosetting resin composition (P1). The metal-resin composite body 8 was named a test piece 8 and evaluated in the same manner as in Example 1.

34.0% by mass of a novolac-type phenol resin (PR-51305, manufactured by Sumitomo Bakelite Co., Ltd.), 6.0% by mass of hexamethylenetetramine, 58.0% by mass of glass fiber (CS3E479, manufactured by Nitto Boseki Co., Ltd., average particle size: 11 μm, average major axis length: 3 mm, average aspect ratio: 270), 0.2% by mass of γ-aminopropyl triethoxysilane (manufactured by Shin-Etsu Chemical Co., Ltd., trade name: KBE-903), 0.5% by mass of magnesium oxide (manufactured by Konoshima Chemical Co., Ltd., trade name: STARMAG), and 1.3% by mass of other components such as a lubricant were subjected to dry mixing. The mixture was subjected to melt kneading using a heating role with a temperature of 90° C. such that the mixture is formed into a sheet, and the resultant was cooled and pulverized, thereby obtaining a granular thermosetting resin composition (P6).

The coefficient of linear expansion $\alpha_R$ of the resin member sheet having a thickness of 3 mm composed of the thermosetting resin composition (P6) was 17 ppm/° C. in the flow direction and 47 ppm/° C. in a direction perpendicular thereto, and the average of the coefficient $\alpha_R$ was 32 ppm/° C. Therefore, a difference between the coefficients of linear expansion ($\alpha_R - \alpha_M$) was 9 ppm/° C.

Figure 6:
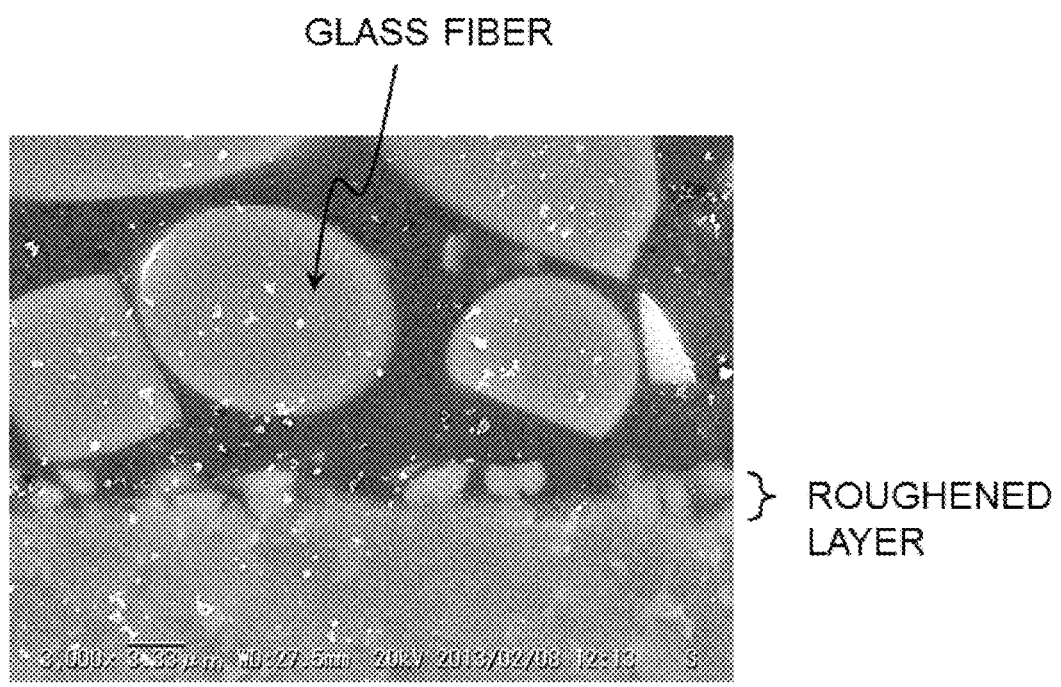
FIG. 6 is a view showing an electron micrograph showing an enlarged view of a section of a bonding portion of a metal-resin composite body obtained in Comparative example 1.

FIG. 6 is an electron micrograph showing an enlarged view of the bonding portion of the metal-resin composite body obtained in Comparative example 1. No filler was present in the depression portions. Herein, whether or not the filler was present in the depression portions was confirmed by energy dispersive X-ray fluorescence spectroscopy.

Comparative Example 2

A metal-resin composite body 9 was prepared by the same method as in Example 1, except that the following thermosetting resin composition (P7) was used instead of the thermosetting resin composition (P1). The metal-resin composite body 9 was named a test piece 9 and evaluated in the same manner as in Example 1.

34.0% by mass of a novolac-type phenol resin (PR-51305, manufactured by Sumitomo Bakelite Co., Ltd.), 6.0% by mass of hexamethylenetetramine, 52.0% by mass of glass fiber (CS3E479, manufactured by Nitto Boseki Co., Ltd., average particle size: 11 μm, average major axis length: 3 mm, average aspect ratio: 270), 6.0% by mass of rock wool (manufactured by Lapinus Fibres, trade name: RF840, average particle size: 5.5 μm, average major axis length: 300 μm, average aspect ratio: 55), 0.2% by mass of γ-aminopropyl triethoxysilane (manufactured by Shin-Etsu Chemical Co., Ltd., trade name: KBE-903), 0.5% by mass of magnesium oxide (manufactured by Konoshima Chemical Co., Ltd., trade name: STARMAG), and 1.3% by mass of other components such as a lubricant were subjected to dry mixing. The mixture was subjected to melt kneading using a heating role with a temperature of 90° C. such that the mixture is formed into a sheet, and the resultant was cooled and pulverized, thereby obtaining a granular thermosetting resin composition (P7).

The coefficient of linear expansion $\alpha_R$ of the resin member sheet having a thickness of 3 mm composed of the thermosetting resin composition (P7) was 16 ppm/° C. in the flow direction and 46 ppm/° C. in a direction perpendicular thereto, and the average of the coefficient c was 31 ppm/° C. Therefore, a difference between the coefficients of linear expansion ($\alpha_R - \alpha_M$) was 8 ppm; ° C.

Comparative Example 3

A metal-resin composite body 10 was prepared by the same method as in Example 1, except that the aluminum alloy sheet A whose surface was not treated with the surface treatment agent used in Example 1 was used instead of the aluminum alloy sheet 1. The metal-resin composite body 10 was named a test piece 10 and evaluated in the same manner as in Example 1.

The characteristics of the aluminum alloy sheet A were as follows.
Ra: 0.5 μm
Rz: 0.7 μm
Specific surface area: 50
Degree of glossiness: 260
Thickness of roughened layer: 0 μm
Average depth of depression portion: 0 μm
Average section width of opening portion: 0 μm
Coefficient of linear expansion $\alpha_M$: 23 ppm/° C.

Furthermore, the depression portion did not have such a sectional shape that, between the opening portion and the bottom portion of the depression portion, there is at least a portion whose section width is greater than the section width of the opening portion.

Comparative Example 4

A metal-resin composite body 11 was prepared by the same method as in Example 1, except that the following aluminum alloy sheet 4 was used instead of the aluminum alloy sheet 1. The metal-resin composite body 11 was named a test piece 11 and evaluated in the same manner as in Example 1.

80 waterproof polishing paper was wet with water and then installed on a smooth surface. Then, the aluminum alloy sheet A not being treated with the surface treatment agent used in Example 1 was gently pressed on the waterproof polishing paper and moved back and forth about 10 cm on the paper 10 times, thereby obtaining the aluminum alloy sheet 4.

The characteristics of the aluminum alloy sheet 4 were as follows.
Ra: 1.5 μm
Rz: 7.0 μm
Specific surface area: 80
Degree of glossiness: 60
Thickness of roughened layer: 7 μm
Average depth of depression portion: 5 μm
Average section width of opening portion: 70 μm
Coefficient of linear expansion $\alpha_M$: 23 ppm/° C.

Furthermore, the depression portion did not have such a sectional shape that, between the opening portion and the bottom portion of the depression portion, there is at least a portion whose section width is greater than the section width of the opening portion.

The above evaluation results are shown in Tables 1 and 2.

TABLE 1

| | | Example 1 | Example 2 | Example 3 | Example 4 | Example 5 | Example 6 | Example 7 | Comparative example 1 | Comparative example 2 | Comparative example 3 | Comparative example 4 |
|---|---|---|---|---|---|---|---|---|---|---|---|---|
| Thermosetting resin (A) | Novolac-type phenol resin | 34.0 | 34.0 | 32.0 | 8.0 | 8.0 | 34.0 | 34.0 | 34.0 | 34.0 | 34.0 | 34.0 |
| | Resol-type phenol resin | — | — | — | 28.0 | 28.0 | — | — | — | — | — | — |
| Filler (B) Filler (B1) | Glass fiber | 52.0 | 52.0 | 52.0 | 55.0 | 55.0 | 52.0 | 52.0 | 58.0 | 52.0 | 52.0 | 52.0 |
| | Rock wool | — | — | — | — | — | — | — | — | 6.0 | — | — |
| Filler (B2) | Wollastonite | 6.0 | — | 6.0 | 6.0 | — | 6.0 | 6.0 | — | — | 6.0 | 6.0 |
| | Clay | — | — | — | — | 3.0 | — | — | — | — | — | — |
| | Calcium silicate hydrate | — | 6.0 | — | — | — | — | — | — | — | — | — |
| Silane coupling agent (C) | γ-aminopropyl triethoxysilane | 0.2 | 0.2 | 0.2 | 0.2 | 0.2 | 0.2 | 0.2 | 0.2 | 0.2 | 0.2 | 0.2 |
| Elastomer (D) | Acrylonitrile-butadiene rubber | — | — | 2.0 | — | 2.0 | — | — | — | — | — | — |
| Curing agent | Hexamethylenetetramine | 6.0 | 6.0 | 6.0 | — | — | 6.0 | 6.0 | 6.0 | 6.0 | 6.0 | 6.0 |
| Auxiliary curing agent | Slaked lime | — | — | — | 1.0 | 1.0 | — | — | — | — | — | — |
| | Magnesium oxide | 0.5 | 0.5 | 0.5 | — | — | 0.5 | 0.5 | 0.5 | 0.5 | 0.5 | 0.5 |
| Others | Lubricant and the like | 1.3 | 1.3 | 1.3 | 1.8 | 2.8 | 1.3 | 1.3 | 1.3 | 1.3 | 1.3 | 1.3 |
| Viscosity characteristics of thermosetting | Melt viscosity at 175° C. [Pa · s] | 420 | 420 | 440 | 420 | 440 | 420 | 420 | 425 | 420 | 420 | 420 |
| | Lowest melt viscosity [Pa · s] | 400 | 400 | 420 | 400 | 420 | 400 | 400 | 410 | 400 | 400 | 400 |

TABLE 1-continued

|  |  | Example 1 | Example 2 | Example 3 | Example 4 | Example 5 | Example 6 | Example 7 | Comparative example 1 | Comparative example 2 | Comparative example 3 | Comparative example 4 |
|---|---|---|---|---|---|---|---|---|---|---|---|---|
| resin composition (P) | Temperature at which the composition reaches lowest melt viscosity [° C.] | 165 | 165 | 170 | 165 | 170 | 165 | 165 | 170 | 165 | 165 | 165 |

TABLE 2

|  |  | Example 1 | Example 2 | Example 3 | Example 4 | Example 5 | Example 6 | Example 7 | Comparative example 1 | Comparative example 2 | Comparative example 3 | Comparative example 4 |
|---|---|---|---|---|---|---|---|---|---|---|---|---|
| Characteristics of aluminum alloy sheet | Type of aluminum alloy sheet | 1 | 1 | 1 | 1 | 1 | 2 | 3 | 1 | 1 | A | 4 |
| | Ra [μm] | 4.0 | 4.0 | 4.0 | 4.0 | 4.0 | 4.0 | 1.0 | 4.0 | 4.0 | 0.5 | 1.5 |
| | Rz [μm] | 15.5 | 15.5 | 15.5 | 15.5 | 15.5 | 29.0 | 4.0 | 15.5 | 15.5 | 0.7 | 7.0 |
| | Thickness of roughened layer [μm] | 15 | 15 | 15 | 15 | 15 | 30 | 4 | 15 | 15 | 0 | 7 |
| | Average depth of depression portion [μm] | 13 | 13 | 13 | 13 | 13 | 28 | 3.5 | 13 | 13 | 0 | 5 |
| | Average section width of opening portion [μm] | 14 | 14 | 14 | 14 | 14 | 5 | 3 | 14 | 14 | 0 | 70 |
| | Specific surface area [—] | 270 | 270 | 270 | 270 | 270 | 290 | 160 | 270 | 270 | 50 | 80 |
| | Degree of glossiness [—] | 10 | 10 | 10 | 10 | 10 | 9 | 8 | 10 | 10 | 260 | 60 |
| Characteristics of metal-resin composite body | $\alpha_R - \alpha_M$ [ppm/° C.] | 9 | 9 | 8 | 9 | 9 | 9 | 9 | 9 | 8 | 9 | 9 |
| | Whether or not filler is present in depression portion | Present | Present | Present | Present | Present | Present | Present | Absent | Absent | Absent | Absent |
| | Average major axis length of filler in depression portion [μm] | 0.5 | 0.4 | 0.5 | 0.5 | 0.4 | 0.5 | 0.5 | — | — | — | — |
| | Average aspect ratio of filler in depression portion [—] | 1.1 | 1.1 | 1.1 | 1.1 | 7.0 | 1.1 | 1.1 | — | — | — | — |
| | Whether or not there is sea-island structure | — | — | Present | — | Present | — | — | — | — | — | — |
| | Average diameter of island phase [μm] | — | — | 7 | — | 7 | — | — | — | — | — | — |
| | Tensile shearing strength [MPa] | 28 | 28 | 29 | 28 | 30 | 30 | 27 | 24 | 22 | 1 | 1 |
| | Bending strength [MPa] | 360 | 355 | 367 | 362 | 362 | 365 | 361 | 358 | 355 | 260 | 265 |

In the metal-resin composite bodies 1 to 7 obtained in Examples 1 to 7, the filler was observed in the depression portions constituting the irregularities of the roughened layer. Therefore, the metal-resin composite bodies 1 to 7 were excellent in the tensile shearing strength, the bending strength, and the bond strength between the resin member and the metal member.

In contrast, in all of the metal-resin composite bodies 8 and 9 obtained in Comparative examples 1 and 2, the filler was not observed in the depression portions, and the metal-resin composite bodies 8 and 9 had poor tensile shearing strength. Furthermore, in the metal-resin composite bodies 10 and 11 obtained in Comparative examples 3 and 4, not only the tensile shearing strength but also the bending strength were extremely poor.

The present application claims priority based on Japanese Patent Application No. 2013-258455 filed on Dec. 13, 2013, the entire content of which is incorporated here.

The invention claimed is:
1. A metal-resin composite body consisting of a resin member and a metal member,
wherein the resin member has the thickness of 3 mm to 50 mm and is obtained by curing a thermosetting resin composition containing a thermosetting resin and a filler,
wherein the thermosetting resin is consisting of a phenol resin,
the metal member has the thickness of 0.01 mm to 50 mm, and has a roughened layer including fine irregularities on at least a bonding surface bonded to the resin member,
an average section width of opening portions of the depression portions is equal to or greater than 2 μm and equal to or less than 60 μm,
an average depth of the depression portions is equal to or greater than 0.5 μm and equal to or less than 40 μm,
the content of the filler is equal to or greater than 30% by mass and equal to or less than 80% by mass with respect to the total weight of the resin member,
the filler has an average particle size in a weight-based particle size distribution measured by a laser diffraction and scattering-type particle size distribution analysis method of equal to or greater than 0.1 µm and equal to or less than 5 µm, in an amount of equal to or greater than 1% by mass and equal to or less than 30% by mass with respect to the total amount of the filler, the resin member and the metal member are directly bonded to each other without the aid of an adhesive, a portion of the filler is present in depression portions constituting the irregularities of the roughened layer, an average major axis length of the filler present in the depression portions that is determined through image analysis performed on an electron micrograph is equal to or greater than 0.1 µm and equal to or less than 5.0 µm, and the filler present in the depression portions is one kind of filler or two or more kinds of filler selected from the group consisting of wollastonite, kaolin clay, talc, calcium carbonate, zinc oxide, calcium silicate hydrate, aluminum borate whiskers, and potassium titanate fiber.

2. The metal-resin composite body according to claim 1, wherein each of the depression portions has such a sectional shape that, between an opening portion and a bottom portion of the depression portion, there is at least a portion whose section width is greater than a section width of the opening portion.

3. The metal-resin composite body according to claim 1, wherein an average aspect ratio of the filler present in the depression portion is equal to or greater than 1 and equal to or less than 50.

4. The metal-resin composite body according to claim 1, wherein a thickness of the roughened layer is within a range of equal to or greater than 3 µm and equal to or less than 40 µm.

5. The metal-resin composite body according to claim 1 wherein the phenol resin is one kind of resin or two or more kinds of resin selected from the group consisting of a novolac-type phenol resin, a resol-type phenol resin, and an arylalkylene-type phenol resin.

6. The metal-resin composite body according to claim 1, wherein the resin member further contains an elastomer.

7. The metal-resin composite body according to claim 6, wherein the resin member has a sea-island structure, and the elastomer is present in island phases.

8. The metal-resin composite body according to claim 7, wherein the average diameter of the island phases that is determined through image analysis performed on an electron micrograph is equal to or greater than 0.1 µm and equal to or less than 100 µm.

9. The metal-resin composite body according to claim 6, wherein the elastomer is one kind of elastomer or two or more kinds of elastomer selected from the group consisting of unmodified polyvinyl acetate, polyvinyl acetate modified with carboxylic acid, polyvinyl butyral, natural rubber, isoprene rubber, styrene-butadiene rubber, butadiene rubber, chloroprene rubber, butyl rubber, ethylene propylene rubber, acryl rubber, styrene-isoprene rubber, acrylonitrile-butadiene rubber, urethane rubber, silicon rubber, and fluorine rubber.

10. The metal-resin composite body according to claim 1, wherein when the thermosetting resin composition is heated to become to a melted state from 60° C. at a heating rate of 3° C./min and a frequency of 1 Hz by using a dynamic viscoelasticity measurement instrument, the melt viscosity of the composition decreases during the initial stage but increases after the composition reaches the lowest melt viscosity, and the lowest melt viscosity is within a range of equal to or greater than 10 Pa·s and equal to or less than 2,000 Pa·s.

11. The metal-resin composite body according to claim 10, wherein the temperature at which the thermosetting resin composition reaches the lowest melt viscosity is equal to or higher than 100° C. and equal to or lower than 250° C.

12. The metal-resin composite body according to claim 1, wherein the metal member is formed of one kind of metal or two or more kinds of metal selected from the group consisting of steel, stainless steel, aluminum, an aluminum alloy, magnesium, a magnesium alloy, copper, and a copper alloy.

13. The metal-resin composite body according to claim 1 that is obtained by curing the thermosetting resin composition by a molding method selected from an injection molding method, a transfer molding method, a compression molding method, and an injection and compression molding method in a state where at least a portion of the thermosetting resin composition comes into contact with the bonding surface of the metal member.

* * * * *